US009239576B2

(12) United States Patent
Bellville et al.

(10) Patent No.: US 9,239,576 B2
(45) Date of Patent: Jan. 19, 2016

(54) METHODS AND APPARATUS TO APPLY MULTIPLE TRIP LIMITS TO A DEVICE IN A PROCESS CONTROL SYSTEM

(75) Inventors: Keith Richard Bellville, Round Rock, TX (US); Gary Keith Law, Georgetown, TX (US); Godfrey R. Sherriff, Austin, TX (US); David Mark Smith, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 556 days.

(21) Appl. No.: 13/399,251

(22) Filed: Feb. 17, 2012

(65) Prior Publication Data

US 2013/0218301 A1 Aug. 22, 2013

(51) Int. Cl.
*G05B 11/01* (2006.01)
*G05B 23/02* (2006.01)

(52) U.S. Cl.
CPC ................................. *G05B 23/0235* (2013.01)

(58) Field of Classification Search
CPC ...................................................... G05B 15/00
USPC ................................ 700/12; 318/445; 290/44
See application file for complete search history.

(56) References Cited

U.S. PATENT DOCUMENTS

| 7,130,703 | B2* | 10/2006 | Ott et al. ........................ 700/80 |
| 2003/0102836 | A1* | 6/2003 | McCall ........................ 318/445 |
| 2004/0199364 | A1* | 10/2004 | Law et al. ..................... 702/189 |
| 2004/0230402 | A1* | 11/2004 | St. Jean ........................ 702/189 |
| 2011/0158786 | A1* | 6/2011 | Molitor et al. ..................... 415/1 |
| 2011/0172839 | A1* | 7/2011 | Brown et al. ................... 700/292 |
| 2011/0210551 | A1* | 9/2011 | Scholte-Wassink ............ 290/44 |
| 2012/0125736 | A1* | 5/2012 | Twigger et al. ............. 198/502.1 |

FOREIGN PATENT DOCUMENTS

| GB | 2400190 | 10/2004 |
| GB | 2400688 | 10/2004 |

OTHER PUBLICATIONS

Intellectual Property Office, "Search Report", issued in connection with corresponding Great Britain Patent Application No. GB1302720.6 dated Feb. 27, 2014 (3 pages).

* cited by examiner

*Primary Examiner* — Robert Fennema
*Assistant Examiner* — Anthony Whittington
(74) *Attorney, Agent, or Firm* — Hanley Flight and Zimmerman, LLC

(57) ABSTRACT

Methods and apparatus to apply multiple trip limits to a device in a process control system are disclosed. An example method involves monitoring a value of a parameter associated with the operation of the device and receiving an input indicative of an operational state of the device, where a first input indicates a first operational state and a second input indicates a second operational state. If the first input is received, comparing via a function block the value of the parameter to a first trip limit, and if the second input is received, comparing via the function block the value of the parameter to a second trip limit, and implementing a response based on the comparison.

23 Claims, 5 Drawing Sheets

METHODS AND APPARATUS TO APPLY MULTIPLE TRIP LIMITS TO A DEVICE IN A PROCESS CONTROL SYSTEM

SYSTEM FIELD OF THE DISCLOSURE

This disclosure relates generally to process control systems and, more particularly, to methods and apparatus to apply multiple trip limits to a device in a process control system.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, and to otherwise manage the operation of the process control system.

Many industries now implement process control systems with the use of digital control and communications between field devices, controllers, and other elements of a process control system. With the rise of digital control and communications, a number of standard digital as well as combined analog and digital open communication protocols have been developed to facilitate the communications between field devices and controllers. Some of the protocols utilize a basic building block or software construct commonly referred to as a function block.

In general, function blocks are programs that, when executed, perform one or more algorithms or sequences of operation relevant to a process control system for which a process engineer has configured the function blocks. There are many types of function blocks, each of which generally performs a specific portion of a process control routine. Typically, function blocks implement input, control, output, as well as other functions within a process control system and can be downloaded and instantiated within controllers and/or field devices distributed throughout a process control system.

For example, an analog input (AI) function block may be instantiated within a sensor or transmitter configured to measure a parameter (e.g., temperature, strain, flow, etc.), and an analog voter (AVTR) function block may be instantiated within a controller, which may be in communication with the sensor or transmitter performing the AI function block to compare the analog input to a configured trip limit to determine whether an appropriate response should be tripped and implemented based on the comparison. An AVTR function block is called a "voter" block because it can receive multiple inputs that may be compared with the configured trip limit, where each comparison constitutes one vote. If an input exceeds the configured trip limit, the AVTR function block counts that event as a vote to set the output to Tripped. If the required number of inputs "vote" to trip, the output of the AVTR function block goes to a tripped value.

Many other types of function blocks can be instantiated within field devices and controllers and interlinked via communication media in a similar manner to perform almost any desired function of a process control scheme.

SUMMARY

In one example, a method to apply multiple trip limits to a device in a process control system involves monitoring a value of a parameter associated with the operation of the device and receiving an input indicative of an operational state of the device, where a first input indicates a first operational state and a second input indicates a second operational state. If the first input is received, comparing via a function block the value of the parameter to a first trip limit, and if the second input is received, comparing via the function block the value of the parameter to a second trip limit, and implementing a response based on the comparison.

In another example, a processor, when operated, implements a function block to receive an input indicative of an operational state of a process control system device and first and second trip limits for a parameter associated with the operation of the device, wherein the first and second trip limits are associated with respective first and second operational states of the device. The processor further implements the function block to determine when the device is in a first operational condition by enabling the first trip limit when the input indicates the device is in the first operational state, enabling the second trip limit when the input indicates the device is in the second operational state; and determining when the parameter passes the enabled trip limit; and to implement a response when the device is in the first operational condition.

DETAILED DESCRIPTION

Figure 1:
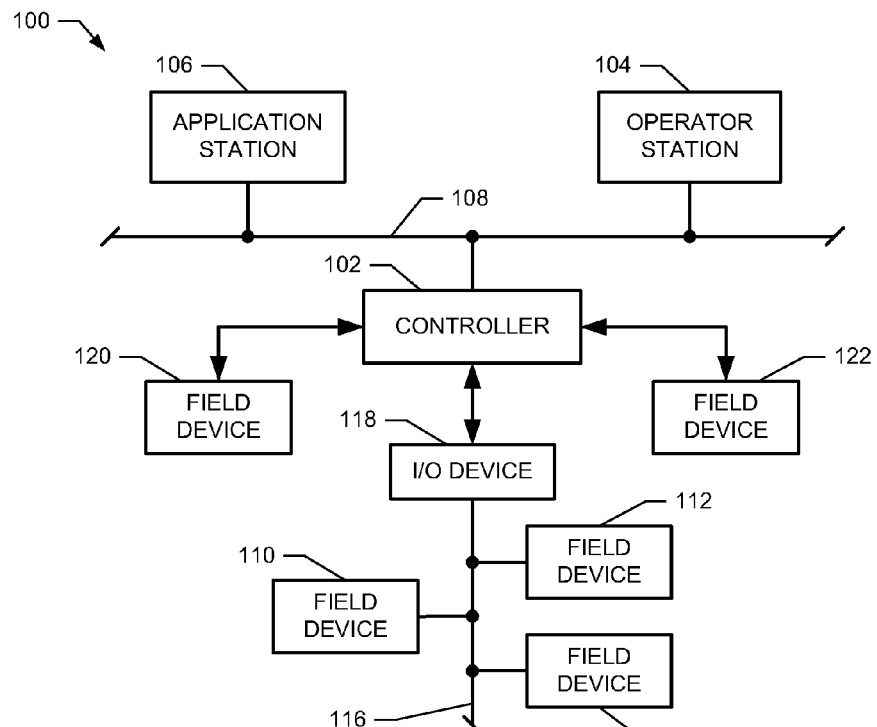
FIG. 1 is a schematic illustration of an example process control system.

Under many process control system schemes it is desirable to have multiple trip limits applied to a single device. For example, some parameters within a control system (e.g., temperature, pressure, etc.) may need to be within a certain range having upper and lower bounds and, therefore, require a low limit and a high limit. In other circumstances, a parameter within a control system may only be bounded on one side. However, process engineers may set a multi-level hierarchy of limits that implement different responses as each successive limit is passed. For example, a parameter may have a first high limit that provides a warning if exceeded and a second high limit higher than the first (commonly referred to as a high-high limit) that provides a critical warning and/or trips the device into a safe state (e.g., shut down).

In yet other circumstances, process engineers may set different limits for a device in a process control system environment based upon the operational state of the device. For example, in a typical machinery protection system, a vibration trip limit defining an unsafe level of vibration may be configured to trip a machine to a safe state (e.g., off) when the limit is exceeded during a normal running state of the machine (hereinafter referred to as a normal operational state). However, during other operational states (e.g., startup, slow roll, maintenance, etc.) the vibration of the machine may exceed the normal running vibrational trip limit and trip the machine to shut down even though the operational condition (i.e., high vibrations) is expected due to the operational state of the machine being in a state other than the normal operational state. Therefore, it may be desirable to have a different trip limit that applies to certain known states other than the normal operational state. Such operational states other than the normal operational state are herein referred to as abnormal operational states.

Typically, to implement multiple trip limits for a device in a process control system, after configuring a first trip limit associated with a first operational state (i.e., a normal operational state) of a device, a process engineer may configure a trip multiply factor that is enabled during abnormal operational state(s) to effectively raise the trip limit by multiplying the first trip limit by the multiply factor. The product of these two values becomes a second trip limit to be applied during the abnormal operational state(s). Designating when the trip multiply factor should be enabled is typically accomplished by wiring a key switch, push button, etc., to the control system. When an operator engages the key switch, a signal is sent to the control system to enable the multiply factor and to apply the resulting second trip limit. However, there are several problems and/or limitations with this traditional approach.

First, there is no way for the control system to detect whether the key switch has malfunctioned and may be improperly engaged in the enabled position. As a result, the second trip limit may be used while a device is in a normal operational state when the first trip limit should apply. This may give rise to potentially unsafe and/or otherwise undesirable operational conditions without the intended trip response being implemented when a parameter passes the first trip limit.

Second, there is no time limit associated with the trip multiply factor to disable the second trip limit corresponding to the abnormal operational state. For example, in many instances, the typical duration of an abnormal operational state may be known (e.g., the time for a machine to start up) such that continuing in the abnormal operational state beyond that time may suggest an unsafe and/or otherwise undesirable operational condition. Thus, without a time limit, it is up to operators to track how long the second trip limit is to apply giving rise to potential errors and/or taking the attention of operators away from other tasks related to the operation of the process control system. This problem is exacerbated by the fact that in typical implementations of multiple trip limits, operators must engage the key switch or other indicator of the abnormal operational state for the entire duration that the device is to be monitored relative to the second trip limit. Accordingly, not only must operators keep track of the duration of the abnormal operational state but they must hold the key switch during that period further limiting them from attending to other aspects of the process control system.

Third, under the traditional approach of applying multiple trip limits to a device described above, the trip limits are not independent of one another. Rather, the second trip limit (associated with abnormal operational states) is based on the first trip limit via a multiply factor. As such, if an engineer desires to alter the first trip limit but keep the second trip limit the same, the engineer may need to perform a back calculation to determine how the multiply factor needs to be adjusted so that the product of the multiply factor and the altered first trip limit still amounts to the desired second trip limit. However, if the engineer adjusts the first trip limit but fails to recalculate the multiply factor based on the change in the first trip limit, then the second trip limit may be at an incorrect value either causing the device to trip too soon or two late depending on the direction the first trip limit was adjusted.

Finally, there may be configuration errors made when changing the trip limit that do not return the trip limit to the first trip limit (associated with a normal operational state) when the trip multiply factor is disengaged. Determining when the multiply factor applies (i.e., when a device is in an abnormal operational state), as well as actually multiplying the first trip limit and the multiply factor in the typical approach, is accomplished through a calculation (CALC) function block. A CALC function block enables a process engineer to write custom code that uses the inputs to determine the proper output. If the logic expressions written by an operator and/or engineer are incorrect, the proper trip limit applied to the control system may also be incorrect or the configured function block may otherwise work improperly. The actual digital control configuration using function blocks for this known approach and its attending limitations are discussed in further detail below in connection with FIGS. 3 and 4.

FIG. 1 is a schematic illustration of an example process control system 100. The example process control system 100 of FIG. 1 includes one or more process controllers (one of which is designated at reference numeral 102), one or more operator stations (one of which is designated at reference numeral 104), and one or more workstations (one of which are designated at reference numeral 106). The example process controller 102, the example operator station 104, and the example workstation 106 are communicatively coupled via a bus and/or local area network (LAN) 108, which is commonly referred to as an application control network (ACN).

The example operator station 104 of FIG. 1 allows an operator and/or engineer to review and/or operate one or more operator display screens and/or applications that enable the operator and/or engineer to view process control system variables, view process control system states, view process control system conditions, view process control system alarms, and/or change process control system settings (e.g., set points, operating states, clear alarms, silence alarms, etc.). An example manner of implementing the example operator station 104 of FIG. 1 is described below in connection with FIG. 2. Example function blocks and related interfaces that may be used to implement the example operator station 104 are described below in connection with FIGS. 5 and 6.

Figure 5:
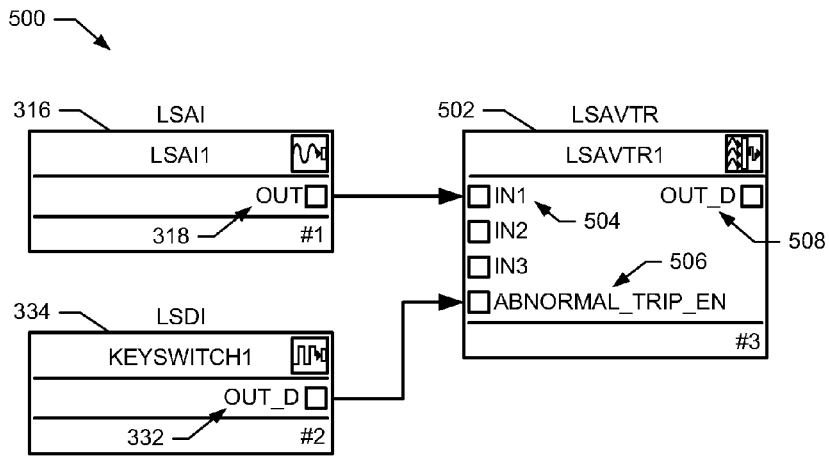
FIG. 5 illustrates an example schematic layout of a control module of function blocks of FIG. 2 configured to apply multiple trip limits to a single parameter of a process control system device via the example operator station of FIG. 1 and/or FIG. 2.

The example operator station 104 includes and/or implements a digital control application to allow process control system operators and/or engineers to configure functions blocks within control modules (e.g., the control module of FIG. 5). The example workstation 106 of FIG. 1 may be configured as an application station to perform one or more information technology applications, user-interactive applications and/or communication applications. For example, the application station 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hardwired and/or wireless Ethernet communication scheme. However, as will be readily appreciated by those having ordinary skill in the art, any other suitable communication medium(s) and/or protocol(s) could be used. Further, although a single LAN 108 is illustrated in FIG. 1, more than one LAN and/or other alternative pieces of communication hardware may be used to provide redundant communication paths between the example systems of FIG. 1.

The example controller 102 of FIG. 1 is coupled to a plurality of smart field devices 110, 112 and 114 via a digital data bus 116 and an input/output (I/O) gateway 118. The smart field devices 110, 112, and 114 may be Fieldbus compliant valves, actuators, sensors, etc., in which case the smart field devices 110, 112, and 114 communicate via the digital data bus 116 using the well-known Foundation Fieldbus protocol. Of course, other types of smart field devices and communication protocols could be used instead. For example, the smart field devices 110, 112, and 114 could instead be Profibus and/or HART compliant devices that communicate via the data bus 116 using the well-known Profibus and HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, and 114, one or more non-smart field devices 120 and 122 may be communicatively coupled to the example controller 102. The example non-smart field devices 120 and 122 of FIG. 1 may be, for example, conventional 2-20 milliamp (mA) or 0-10 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to control information presented to process control system operators described in greater detail below may be advantageously employed, persons of ordinary skill in the art will readily appreciate that the methods and apparatus to control information presented to operators described herein may, if desired, be advantageously employed in other process plants and/or process control systems of greater or less complexity (e.g., having more than one controller, across more than one geographic location, etc.) than the illustrated example of FIG. 1.

Figure 2:
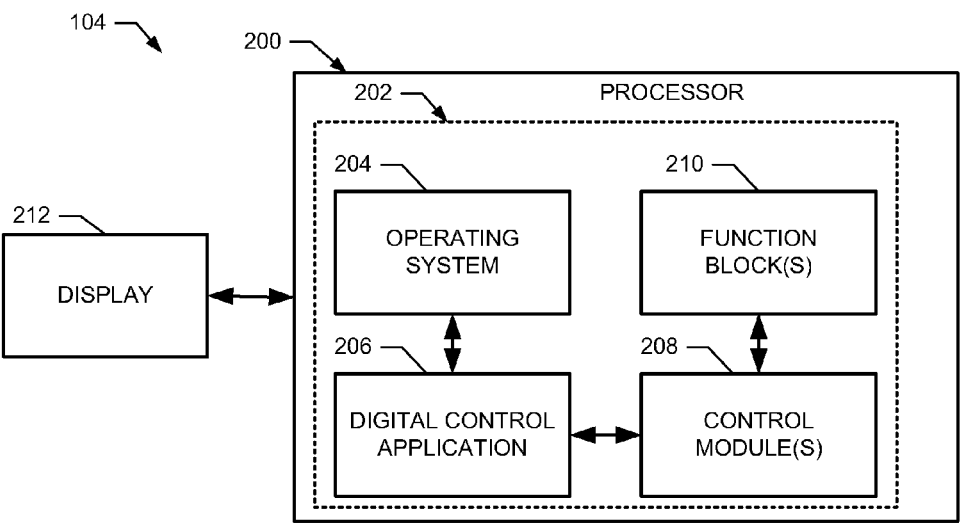
FIG. 2 illustrates an example manner of implementing the example operator station of FIG. 1.

FIG. 2 illustrates an example manner of implementing the example operator station 104 of FIG. 1. The example operator station 104 of FIG. 2 includes at least one programmable processor 200. The example processor 200 of FIG. 2 executes coded instructions present in a main memory 202 of the processor 200 (e.g., within a random-access memory (RAM) and/or a read-only memory (ROM)). The processor 200 may be any type of processing unit, such as a processor core, a processor and/or a microcontroller. The processor 200 may execute, among other things, an operating system 204, a digital control application 206, process control module(s) 208, and function block(s) 210. An example operating system 204 is an operating system from Microsoft®. The example main memory 202 of FIG. 2 may be implemented by and/or within the processor 200 and/or may be one or more memories and/or memory devices operatively coupled to the processor 200.

To allow an operator and/or engineer to interact with the example processor 200, the example operator station 104 of FIG. 2 includes any type of display 212. Example displays 212 include, but are not limited to, a computer monitor, a computer screen, a television, a mobile device (e.g., a smart phone, a Blackberry™ and/or an iPhone™), etc. capable to display user interfaces and/or applications implemented by the processor 200 and/or, more generally, the example operator station 104.

The example operating system 204 of FIG. 2 displays and/or facilitates the display of a user interface for the digital control application 206 by and/or at the example display 212. The digital control application 206 may configure and execute the operations or processes of the control module(s) 208. Control modules typically contain control routines that may be instantiated and executed to perform control functions or activities associated with respective process control system areas, devices, etc. More specifically, the control module(s) 208 may be associated with one or more pieces of equipment, devices, and/or other elements in a control system and, thus, may be used to monitor and/or control those pieces equipment, devices and/or elements.

The example control module(s) 208 are made up of communicatively interconnected function block(s) 210, which are objects in an object-oriented programming protocol that perform functions within the control scheme based on inputs and provide outputs to other function blocks within the control scheme. The control module(s) 208 may be dedicated to a controller (e.g., the controller 102 of FIG. 1) and, in some cases, a field device (e.g., any of the field devices 110, 112, 114, 120, 122 of FIG. 1) may store and execute a control module 208 or a portion thereof.

The function blocks 210 may each contain one or more mathematical functions (e.g., summation operations, multiplication operations, division operations, etc.), logical functions, expressions (e.g., logical OR, AND, etc.), control functions, interfaces, tuning functions, or any other desired functions within a process control system.

The function blocks 210 are composed of software and/or any other type of logic to process input parameters according to a specified algorithm and an internal set of control parameters. In this manner, each of the function blocks 210 may produce output parameters that are available for use by the control module 208, other function blocks, or any other software, programmable device, etc. communicatively coupled to the function blocks 210. The parameters associated with the function blocks 210 may pertain to the entire application process (e.g., manufacturing ID, device type, etc.), encapsulate control functions (e.g., PID controller, analog input, etc.), and/or may represent an interface to sensors such as temperature sensors, pressure sensors, flow sensors, etc.

During runtime, after the function blocks 210 are executed using the corresponding input values, its outputs (i.e., output values) are updated and then broadcast to other function blocks 210 and/or any other device of the process control system that reads (e.g., subscribes or binds to) these outputs. The function blocks 210 may reside inside the same field device and/or in different devices of the process control system.

While an example manner of implementing the example operator station 104 of FIG. 1 has been illustrated in FIG. 2, the data structures, elements, processes and devices illustrated in FIG. 2 may be combined, divided, re-arranged, omitted, eliminated and/or implemented in any other way. Further, the example operating system 204, the example digital control application 206, the example control module(s) 208, the example function block(s) 210, and/or, more generally, the example operator station 104 of FIG. 2 may be implemented by hardware, software, firmware and/or any combination of hardware, software and/or firmware. Further still, the example operator station 104 may include additional elements, processes and/or devices instead of, or in addition to, those illustrated in FIG. 2, and/or may include more than one of any or all of the illustrated data structures, elements, processes and devices.

Figure 3:
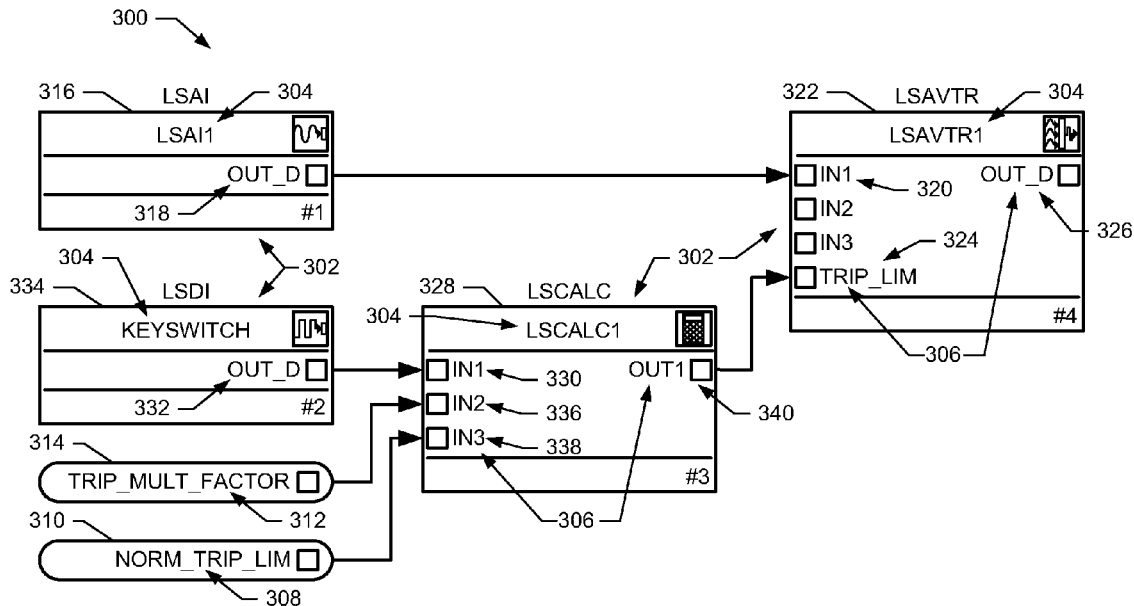
FIG. 3 illustrates a known schematic layout of a known control module of function blocks of FIG. 2 configured to apply multiple trip limits to a single parameter of a process control system device.

FIG. 3 illustrates a schematic layout of a known control module 300 of function blocks 302 configured to apply multiple trip limits to a single parameter of a process control system device. As shown, each of the function blocks 302 is identified by a unique tag 304 that may be assigned by a configuration engineer. Additionally, the parameters of each function block 302 are represented by object descriptions or parameter names 306 that define how the parameters are communicated throughout the process control system. Thus, many parameters in a system may be uniquely identified by reference to their tag (i.e., the tag 304 of the function block 302 associated with the parameter) and parameter name 306.

A first trip limit 308 (labeled as NORMAL_TRIP_LIM in FIG. 3) for a normal operational state is defined by a parameter input via block 310. A trip multiply factor 312 (labeled as TRIP_MULT_FACTOR in FIG. 3) is provided via block 314 to calculate a second trip limit by multiplying the first trip limit 308 and the trip multiply factor 312 as described in greater detail below. An analog input (AI) function block 316 measures and/or receives the value of a parameter associated with the device to be monitored and produces a corresponding device parameter 318. The value of the device parameter 318 output from the AI function block 316 is received as an input parameter 320 by an analog voter (AVTR) function block 322. The AVTR function block 322 compares the value of the device parameter 318 as input parameter 320 to a value of an input trip limit 324 of the AVTR function block 322. When the value of the device parameter 318 passes the value of the input trip limit 324, the AVTR function block 322 sets a trip output 326 to a tripped value indicating a response to the state of the device being monitored is to be implemented. However, as long as the input parameter 320 does not pass the input trip limit 324, the AVTR function block 322 does not provide the trip output 326 indicating the limit has been tripped. As used herein, a parameter value passes the relevant trip limit when the parameter either exceeds or drops below the trip limit depending upon whether the trip limit is defined as a high or a low limit, respectively.

The input trip limit 324 may correspond to either the first trip limit 308 defined via block 310 or a second trip limit defined by a value equal to the first trip limit 308 multiplied by the trip multiply factor 312 input via the block 314. Determining which value is to serve as the input trip limit 324 of the AVTR function block 322, as well as performing the multiplication calculation for the second trip limit, is accomplished by a calculation (CALC) function block 328. The CALC function block 328 may receive a first input parameter 330 via an output 332 of a discrete input (DI) function block 334 that indicates when a key switch associated with the DI function block 338 has been engaged to indicate whether the device is in an abnormal operational state. The CALC function block 328 may receive the multiply factor 312 and the first trip limit 308 as second and third input parameters 336 and 338, respectively. Based on the algorithm performed by the CALC function block 328, as discussed below in FIG. 4, a calculated trip limit 340 is determined and serves as the input trip limit 324 to the AVTR function block 322.

Figure 4:
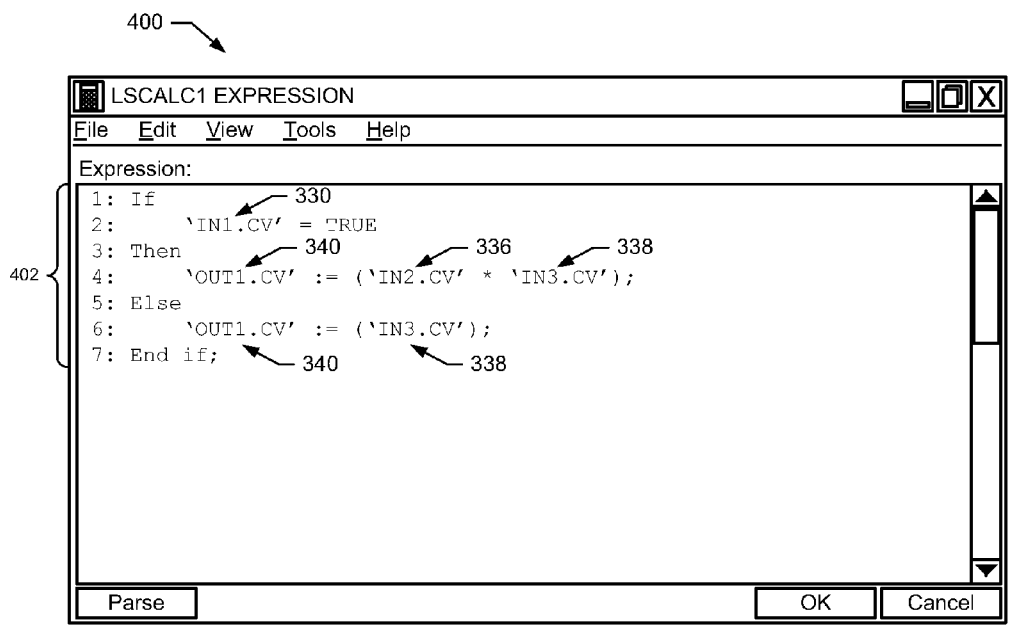
FIG. 4 illustrates a known function block configuration interface to configure the logic of the known CALC function block shown in FIG. 3.

FIG. 4 illustrates a known function block configuration interface 400 to configure the known CALC function block 328 shown in FIG. 3. In general, the CALC function block 328 has no inherent logic preconfigured within it to use the inputs 330, 336, and 338 to determine the calculated trip limit 340 as the output of the CALC function block 328. Rather, the configuration interface 400 allows an operator and/or engineer to define what the calculated trip limit 340 of the CALC function block 328 should be based on the inputs 330, 336, and 338 being processed in accordance with a coded logic expression 402 written by the operator and/or engineer. In FIG. 4, the coded expression 402 involves determining whether the key switch is engaged by testing whether the first input parameter 330 has a value of true. Depending upon the value of the first input parameter 330 (i.e., true or not), the coded expression 402 then defines a calculated output value 340 that either equals the third input parameter 338 (corresponding to the first trip limit 308) or the product of the third input parameter 338 and the second input parameter 336 (corresponding to the trip multiply factor 305) to arrive at a second trip limit. In this way, the appropriate calculated trip limit 340 may be determined and set as the input trip limit 324 of the AVTR function block 322 shown in FIG. 3.

FIG. 5 illustrates an example schematic layout of a control module 500 configured to apply multiple trip limits to a single parameter of a process control system device. The control module 500 includes an example AVTR function block 502 that receives inputs from the AI function block 316 shown in FIG. 3 and the DI function block 334 shown in FIG. 3. As described above in connection with FIG. 3, the AI function block 316 measures and/or receives the value of the parameter associated with the device to be monitored and produces the device parameter 318. The device parameter 318 serves as a first input parameter 504 to the example AVTR function block 502. Further, the DI function block 334 produces the output 332 corresponding to whether the key switch associated with the DI function block 334 is engaged to indicate whether the device is in an abnormal operational state. The output 332 is received by the example AVTR function block 502 to serve as an abnormal trip starter input 506 to indicate to the AVTR function block 502 when to apply a second trip limit associated with an abnormal operational state of the device and when to apply a first trip limit associated with a normal operational state of the device.

In this manner, by determining what trip limit should apply and when, the example control module 500 applies multiple trip limits while avoiding the problems associated with the known control module 300 of FIG. 3. In particular, the example control module 500 does not require any coding or back calculations by an operator and/or engineer to configure the first and second trip limits and determine when either is to be applied. Rather, the logic and calculations are performed internally within the AVTR function block 502 based on the inputs 504 and 506, and trip limits directly entered by the operator and/or engineer in a configuration interface associated with the AVTR function block 502 discussed below in connection with FIG. 6. From this configuration, the AVTR function block 502 may produce a trip output 508 indicating whether the relevant trip limit has been passed.

Figure 6:
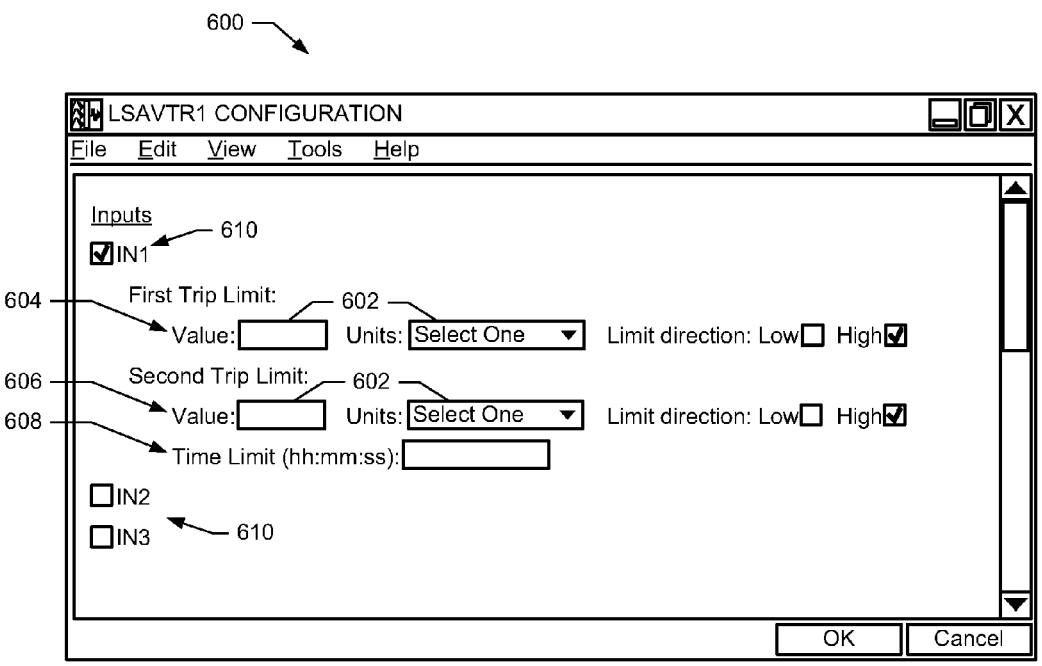
FIG. 6 illustrates an example function block configuration interface to configure the parameters of the AVTR function block shown in FIG. 5.

FIG. 6 illustrates an example function block configuration interface 600 to configure the AVTR function block 502 shown in FIG. 5. The example configuration interface 600 may include entry fields 602 to collect parameters defining a first trip limit 604 to be applied when a device is in a first operational state (i.e., a normal trip limit), a second trip limit 606 to be applied when the device is in a second operational state (i.e., an abnormal trip limit), and/or a time limit 608 associated with the second trip limit. Specifically, the example configuration interface 600 may collect the value and units of the first and second trip limits 604 and 606 as well as the direction of the first and second trip limits 604 and 606 (i.e., a low limit or a high limit) and/or other information via the entry fields 602, which may include entry fields, drop down menus, slider bars, check boxes, etc. Additionally, the interface 600 may also include a means to select (e.g., via check boxes 610) whether one or multiple input parameters are to be compared against the active trip limit in determining whether the trip output 508 is to be set to a tripped value. Furthermore, there may be other configuration parameters (not shown) that enable operators and/or engineers to further define how the AVTR function block 502 functions.

As mentioned above, by specifying the trip limit parameters via the entry fields 602, the problems of known AVTR function blocks are avoided. In particular, separate entry fields 602 for each of the normal trip limit 604 and the abnormal trip limit 606 enables an operator and/or engineer to adjust one of the parameters and keep the other constant without having to back calculate or adjust the other. Further, no coding is required to determine which trip limit 604 or 606 to apply because the determination is done internally by the AVTR function block 502 based on the defined parameters 604, 606, and 608 and the inputs 504 and 506. Similarly, if one of the trip limit parameters is changed, whether intentionally or not, such a change does not affect the other trip limit parameter. As an additional advantage, the separate entry fields 602 enable an operator and/or engineer to see and/or compare the two trip limits directly.

Additionally, the ability to specify a time limit 608 sets a limit on how long the second trip limit 606 corresponding to an abnormal operational state may be active, thereby preventing the second trip limit 606 from remaining active even if the key switch has malfunctioned (e.g., if the key switch becomes stuck in the enabled position) and/or the operational state of the device remains in the abnormal operational state for a longer duration than expected and/or desired (e.g., failing to reach a normal operational state during a start-up within a desired amount of time). Furthermore, with the example control module 500 implementing the example AVTR function block 502, an operator does not need to hold a key switch for the entire duration the abnormal operational state of the device to indicate that the second trip limit is to apply. Rather, engaging the key switch causes the AVTR function block 502 to apply the abnormal trip limit. At the same time, a timer is started to count down until the time limit 608 has elapsed, at which point the AVTR function block 502 automatically returns to the first trip limit regardless of the actual operational state of the device. In this way, operators may focus their attention on other tasks rather than holding the key switch during the entire period of an abnormal operational state and tracking how long they have done so.

Figure 7:
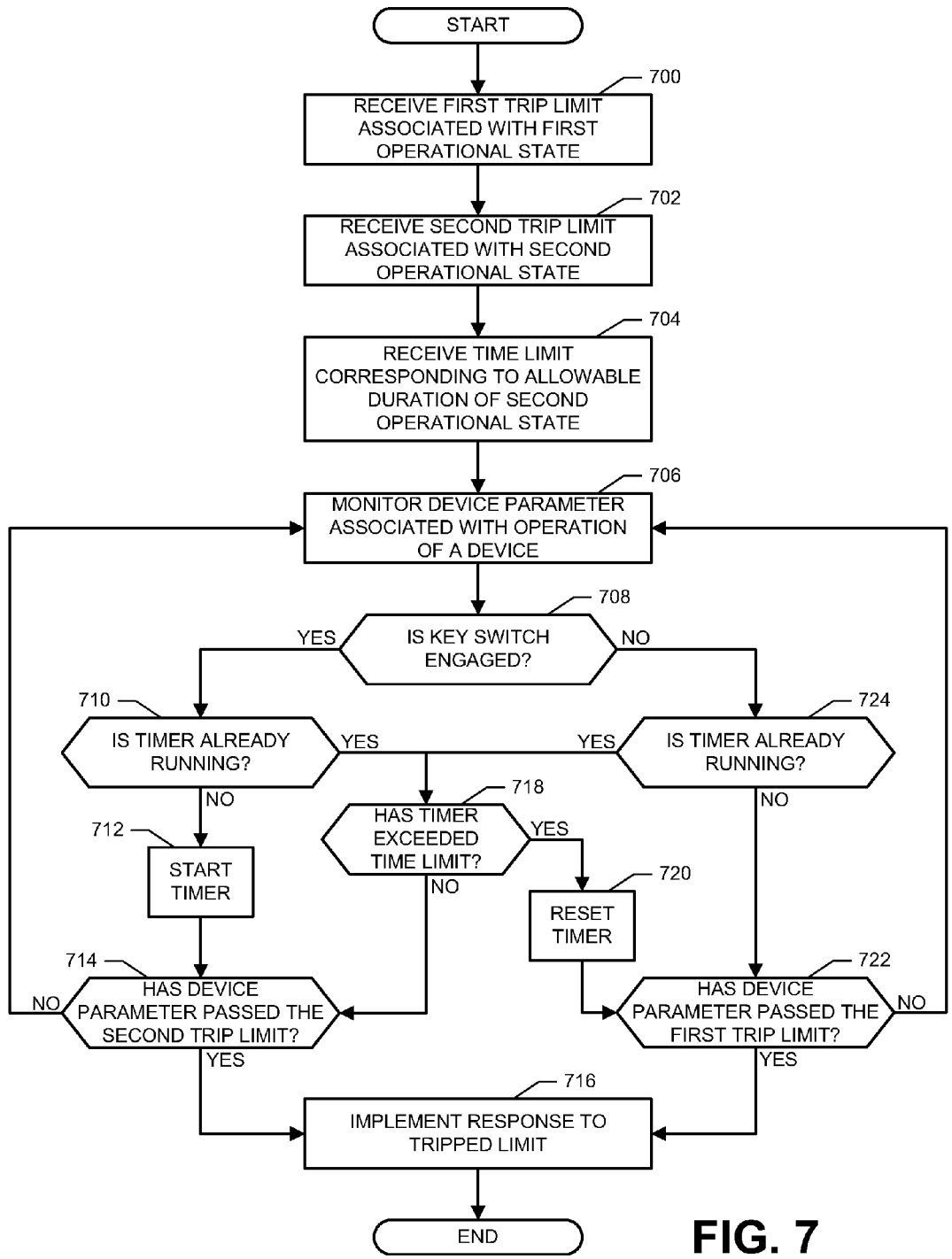
FIG. 7 is a flowchart representative of an example process that may be carried out to implement the example operator station of FIG. 1 and/or FIG. 2.

FIG. 7 is a flowchart representative of an example process that may be carried out to implement the example operator station of FIGS. 1 and/or 2. More particularly, the example process of FIG. 7 may be implemented using machine readable instructions that comprise a program for execution by a processor such as the processor 812 shown in the example computer 800 discussed below in connection with FIG. 8. The program may be embodied in software stored on a tangible computer readable medium such as a CD-ROM, a floppy disk, a hard drive, a digital versatile disk (DVD), a BluRay disk, or a memory associated with the processor 812. Alternatively, some or all of the example process of FIG. 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process of FIG. 7 may be implemented manually or as any combination(s) of any of the foregoing techniques, for example, any combination of firmware, software, discrete logic and/or hardware. Further, although the example process is described with reference to the flowchart illustrated in FIG. 7, many other methods of implementing the example operator station of FIGS. 1 and/or 2 may alternatively be used. For example, the order of execution of the blocks may be changed, and/or some of the blocks described may be changed, eliminated, or combined. Additionally, any or all of the example process of FIG. 7 may be performed sequentially and/or in parallel by, for example, separate processing threads, processors, devices, discrete logic, circuits, etc.

As mentioned above, the example process of FIG. 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example process of FIG. 7 begins at block 700 where the AVTR function block 502 (FIG. 5) receives a first trip limit 604 (FIG. 6) associated with a first operational state (e.g., a normal operational state) of a device that may be stored in a memory 202 (FIG. 2). In the illustrated examples, the first trip limit 604 is received by parameters entered as inputs in the example entry fields 602 of the example function block configuration interface 600 (FIG. 6). The AVTR function block 502 also receives the second trip limit 606 (FIG. 6) associated with a second operational state (e.g., an abnormal operational state) of the device (block 702) that may be stored in the memory 202. The second trip limit 606 is received by parameters entered as inputs in other entry fields 602 of the example function block configuration interface 600. The AVTR function block 502 may also receive the time limit 608 (FIG. 6) corresponding to the allowable and/or desired maximum duration of monitoring the device in the second operational state (block 704) via another entry field 602 of the example function block configuration interface 600 and stored in the memory 202. For example, operators and/or engineers may set the allowable and/or desirable duration for the second operational state based on the normal and/or expected duration of the device to remain in the second operational state (e.g., the typical time period for a machine to start up). Additionally and/or alternatively, operators and/or engineers may set the allowable and/or desirable duration for monitoring the device in the second operational state based on the time before the operational condition of the device would be deemed unsafe or otherwise undesirable to continue in the second operational state. Operators and/or engineers setting the time limit 608 corresponding to the allowable and/or desirable duration of monitoring the device in the second operational state does not necessarily prevent the device from remaining in the second operational state. Rather, the time limit 608 prevents the continued monitoring of the device against the second trip limit corresponding to the second operational state by reverting to the first trip limit as will be described more fully below.

In the example process of FIG. 7, the digital control application 206 (FIG. 2) may monitor a parameter (e.g., the device parameter 318 of FIG. 5) associated with the operation of the device (block 706). For example, the digital control application 206 of FIG. 2 may instantiate a control module 208 containing function blocks 210 arranged according to the example control module 500 of FIG. 5. The AI function block 316 (FIG. 5) may be associated with the device to output the device parameter 318, which serves as the input parameter 504 of the AVTR function block 502. The AVTR function block 502 monitors the device parameter 318 against the trip limits 604 and 606 described above.

At block 708 the AVTR function block 502 determines whether the key switch is engaged. Such a determination is made via the DI function block 334, which produces the output 332 to serve as the abnormal trip starter input 506 of the AVTR function block 502. As described above, operators engage the key switch to indicate the device is in the second operational state, thereby indicating the second trip limit is to apply when monitoring the device parameter 318. However, whether the key switch is engaged is not solely determinative of whether the second trip limit 606 applies because the AVTR function block 502 is configured to limit the application of the second trip limit 606 to the duration corresponding to the time limit 608. Accordingly, if the AVTR function block 502 determines that the key switch is engaged, the AVTR function block 502 then determines whether a timer is already running (block 710). If no timer is running, the example process starts the timer at block 712 and control then advances to block 714 where the AVTR function block 502 determines whether the device parameter 318 has passed the second trip limit 604. The AVTR function block 502 makes such a determination by comparing the device parameter 318 as the parameter input 504 to the previously defined second trip limit 606. If the device parameter 318 has not passed the second trip limit 606, control returns to block 706 to continue monitoring the device parameter 318. However, if the example process of FIG. 7 determines that the device parameter 318 has passed the second trip limit 606 (block 714), the digital control application 206 may implement a response (block 716). For example, after the device parameter 318 passes the second trip limit 606, the output of the AVTR function block 502 indicates the limit has been tripped, which may activate a warning alarm. However, any other appropriate response may also be implemented at block 716 (e.g., shutting down the device).

If the AVTR function block 502 determines at block 710 that the timer is already running (i.e., the key switch was previously engaged and the timer was previously started), the AVTR function block 502 determines whether the timer has exceeded the time limit 608 (block 718). If not, the duration of the operational state of the device is still within the allowable and/or desired time limit 608 such that the second trip limit 606 is still applicable. Therefore, the example process returns control to block 714 to determine whether the device parameter 318 has passed the second trip limit 606 and the example process proceeds accordingly. If the timer has exceeded the time limit 608 then the device parameter 318 is to be monitored relative to the first trip limit 604 regardless of the operational state of the device (i.e., whether it is in a normal or abnormal operational state). Accordingly, when the AVTR function block 502 determines the timer has exceeded the time limit 608, the timer is reset (block 720) and control advances to block 722 where the example process of FIG. 7 determines whether the device parameter 318 has passed the first trip limit 604. Whether the device parameter 318 has passed the first trip limit 604 is determined in the same way as for the second trip limit 608 described above in connection with block 714 except that the comparison is made with the first trip limit 604. If the device parameter 318 has passed the first trip limit 604, the example process advances to block 716 where the digital control application 206 may implement an appropriate response. If the device parameter 318 has not passed the first trip limit 604, control of the example process returns to block 706 to continue monitoring the device parameter 318.

Returning to block 708, if the AVTR function block 502 determines that the key switch is not engaged, the example process advances to block 724 where the AVTR function block 502 determines whether the timer is already running. If the timer is already running (i.e., the key switch was previously engaged and the timer was previously started), the AVTR function block 502 determines whether the timer has exceeded the time limit 608 as described above in connection with block 718 and the example process proceeds accordingly. Thus, in this manner, operators do not need to hold the key switch for the entire duration of the second operational state to nevertheless have the second trip limit 608 apply to the device parameter 318 so long as the timer has not exceeded the time limit 608. Where the key switch is not engaged (determined at block 708) and the timer is not already running (determined at block 724), the example process advances directly to block 722 to determine whether the device parameter 318 has passed the first trip limit 604 as described above.

As shown in the example flowchart of FIG. 7, the response implemented after the device parameter 318 passes the first trip limit 604 (determined at block 722) is represented by the same block (block 716) as the response implemented when the device parameter 318 passes the second trip limit 606 (determined at block 714). However, in some examples, the response implemented when the first trip limit 604 is passed may be configured to be different than the response implemented when the second trip limit 606 is passed by the device parameter 318. For example, while the first limit 604 being tripped may activate an alarm, the second trip limit 606 may force the device into a safe state (e.g., shut down the device).

Figure 8:
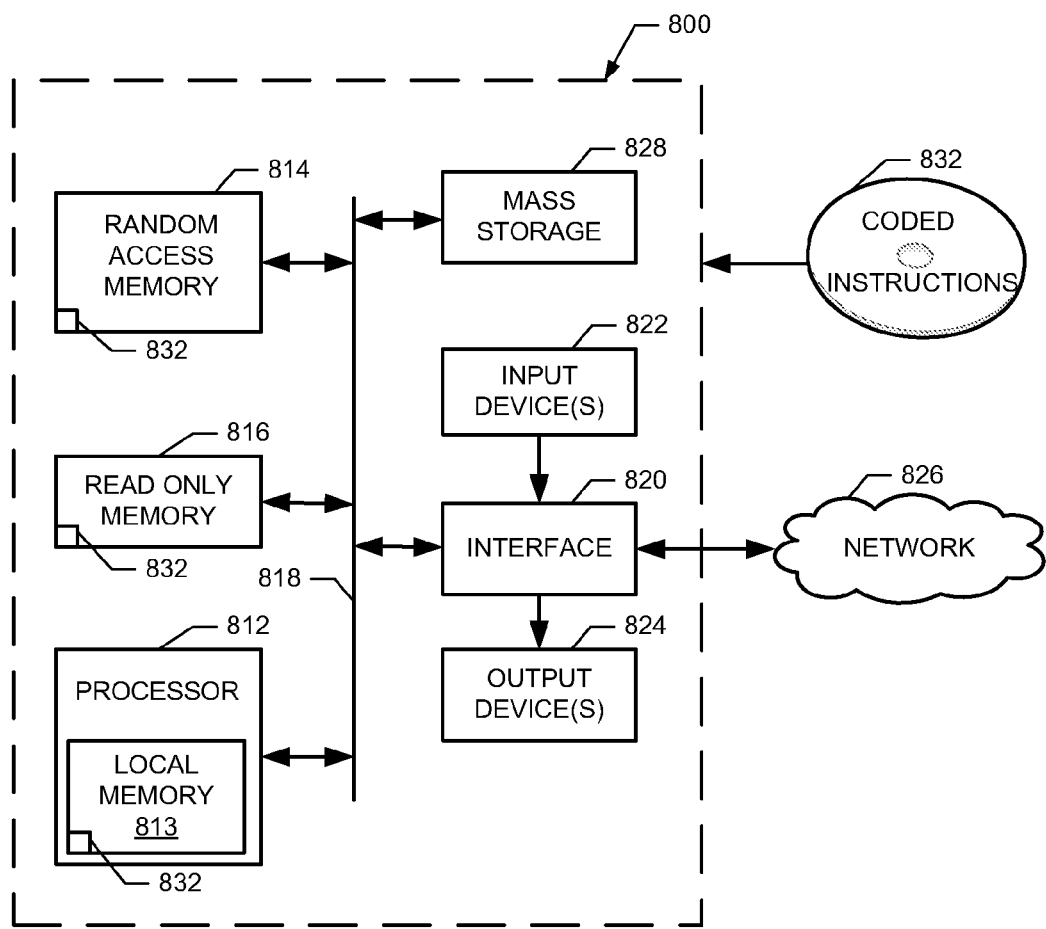
FIG. 8 is a schematic illustration of an example computer that may be used and/or programmed to carry out the example process of FIG. 7 and/or, more generally, to implement the example operator station of FIG. 1 and/or FIG. 2.

FIG. 8 is a schematic illustration of an example computer 800 that may be used and/or programmed to carry out the example process of FIG. 7 and/or, more generally, to implement the example operator station 104 of FIGS. 1 and/or 2. The system 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814 and 816 is controlled by a memory controller.

The computer 800 also includes an interface circuit 820. The interface circuit 820 may be implemented by any type of interface standard, such as an Ethernet interface, a universal serial bus (USB), and/or a PCI express interface. One or more input devices 822 are connected to the interface circuit 820. The input device(s) 822 permit a user to enter data and commands into the processor 812. The input device(s) can be implemented by, for example, a keyboard, a mouse, a touch-screen, a track-pad, a trackball, isopoint and/or a voice recognition system. One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computer 800 also includes one or more mass storage devices 828 for storing software and data. Examples of such mass storage devices 828 include floppy disk drives, hard drive disks, compact disk drives and digital versatile disk (DVD) drives.

The coded instructions 832 to implement the example process of FIG. 7 may be stored in the mass storage device 828, in the volatile memory 814, in the non-volatile memory 816, and/or on a removable storage medium such as a CD or DVD.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. A method to apply multiple trip limits to a device in a process control system comprising:
   monitoring a value of a parameter associated with operation of the device;
   receiving via a function block an input that is either a first input or a second input, the first input indicating the device is in a first operational state and the second input indicating the device is in a second operational state;
   when the first input is received at a first time period:
   (a) comparing via the function block the value of the parameter to a first trip limit; and
   (b) implementing a response based on the comparison of the value of the parameter to the first trip limit;
   when the second input is received at a second time period:
   (a) comparing via the function block the value of the parameter to a second trip limit; and
   (b) implementing the response based on the comparison of the value of the parameter to the second trip limit; and
   wherein the value of the parameter is compared to the first trip limit and not the second trip limit at the first time period associated with the first input, and wherein the value of the parameter is compared to the second trip limit and not the first trip limit at the second time period associated with the second input, wherein the first trip limit and the second trip limit are independently input into the function block by at least one of an operator or an engineer.

2. A method as described in claim 1, wherein the response comprises at least one of sending an alarm to an operator, tripping the device into a third operational state different than the first and second operational states, or shutting down the device.

3. A method as described in claim 2, wherein the value of the parameter in the third operational state is within the first trip limit and within the second trip limit.

4. A method as described in claim 1, further comprising:
   when the input changes to the second input, activating a timer to run a duration of a time limit; and
   after the time limit has elapsed, comparing via the function block the value of the parameter to the first trip limit regardless of the input.

5. A method as described in claim 4, wherein the time limit is independently input into the function block by at least one of an operator or an engineer independently of the first trip limit and the second trip limit.

6. A method as described in claim 1, wherein the first operational state of the device corresponds to a normal operational state of the device, and wherein the second operational state of the device corresponds to an abnormal operational state of the device.

7. A method as described in claim 1, wherein the first trip limit corresponds to a low limit for the parameter and the second trip limit corresponds to a high limit for the parameter.

8. A method as described in claim 1, wherein the first trip limit corresponds to a first low limit for the parameter and the second trip limit corresponds to a second low limit for the parameter lower than the first low limit, or the first trip limit corresponds to a first high limit for the parameter and the second trip limit corresponds to a second high limit for the parameter higher than the first high limit.

9. A method as described in claim 1, wherein the input is received via at least one of a key switch or a push button.

10. A processor which, when operated, implements a function block to:
    receive an input indicating a process control system device is in either a first operational state or a second operational state;
    receive first and second trip limits for a parameter associated with the operation of the device, wherein the first and second trip limits are associated with the respective first and second operational states of the device;
    when the input indicates the process control system device is in the first operational state at a first time period:
    (a) enable the first trip limit to compare with a value of the parameter and disable the second trip limit; and
    (b) implement a first response when a value of the parameter passes the first trip limit; and
    when the input indicates the process control system device is in the second operational state at a second time period:
    (a) enable the second trip limit to compare with the value of the parameter and disable the first trip limit; and
    (b) implement a second response when the value of the parameter passes the second trip limit; and
    wherein the value of the parameter is compared to the first trip limit and not the second trip limit at the first time period associated with the first operational state, and wherein the value of the parameter is compared to the second trip limit and not the first trip limit at the second time period associated with the second operational state, wherein the first trip limit and the second trip limit are independently input into the function block by at least one of an operator or an engineer.

11. A processor as described in claim 10, wherein at least one of first or second operational states corresponds to an unsafe condition.

12. A processor as described in claim 10, wherein the first and second responses comprise at least one of sending an alarm to an operator, tripping the device into a third operational state different than the first and second operational states, or shutting down the device.

13. A processor as described in claim 12, wherein a value of the parameter in the third operational state is within the first trip limit and within the second trip limit.

14. A processor as described in claim 10 which, when operated, implements the function block to further:
    activate a timer when the second trip limit is first enabled to run a duration of a time limit; and
    after the time limit has elapsed, implementing the first response when the parameter passes the first trip limit regardless of which trip limit is enabled.

15. A processor as described in claim 10, wherein the first operational state of the device corresponds to a normal operational state of the device, and wherein the second operational state of the device corresponds to an operational state other than the normal operational state.

16. A processor as described in claim 10, wherein the first trip limit corresponds to a high limit for the parameter and the second trip limit corresponds to a low limit for the parameter.

17. A processor as described in claim 10, wherein the first trip limit corresponds to a first low limit for the parameter and the second trip limit corresponds to a second low limit for the parameter lower than the first low limit, or the first trip limit corresponds to a first high limit for the parameter and the second trip limit corresponds to a second high limit for the parameter higher than the first high limit.

18. A processor as described in claim 10, wherein the input is received via at least one of a key switch or a push button.

19. A tangible article of manufacture storing machine readable instructions which, when executed, cause a machine to at least:
    monitor a value of a parameter associated with operation of a process control system device;
    receive an input that is either a first input or a second input, the first input indicating the device is in a first operational state and the second input indicating the device is in a second operational state;
    when the first input is received at a first time period:
    (a) compare the value of the parameter to a first trip limit; and
    (b) implement a first response based on the comparison of the value of the parameter to the first trip limit; and
    when the second input is received at a second time period:
    (a) compare the value of the parameter to a second trip limit; and
    (b) implement a second response based on the comparison of the value of the parameter to the second trip limit; and
    wherein the value of the parameter is compared to the first trip limit and not the second trip limit at the first time period associated with the first input, and wherein the value of the parameter is compared to the second trip limit and not the first trip limit at the second time period associated with the second input, wherein the first trip limit and the second trip limit are independently input into the function block by at least one of an operator or an engineer.

20. A tangible article of manufacture as described in claim 19, wherein the first and second responses comprise at least one of sending an alarm to an operator, tripping the device into a third operational state different than the first and second operational states, or shutting down the device.

21. A tangible article of manufacture as described in claim 19, wherein the instructions, when executed, further cause the machine to:
    when the input changes to the second trip limit, activate a timer to run a duration of a time limit; and
    after the time limit has elapsed, compare the value of the parameter to the first trip limit regardless of the input.

22. A tangible article of manufacture as described in claim 19, wherein the first operational state of the device corresponds to a normal operational state of the device, and wherein the second operational state of the device corresponds to an abnormal operational state of the device.

23. A tangible article of manufacture as described in claim 19, wherein the input is received via at least one of a key switch or a push button.

* * * * *